US012656802B2

(12) United States Patent
Miyamoto et al.

(10) Patent No.: US 12,656,802 B2
(45) Date of Patent: Jun. 16, 2026

(54) SOLAR POWER GENERATION CONTROL DEVICE

(71) Applicant: TOYOTA JIDOSHA KABUSHIKI KAISHA, Toyota (JP)

(72) Inventors: Yuma Miyamoto, Miyoshi (JP); Takashi Fukai, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 172 days.

(21) Appl. No.: 18/628,958

(22) Filed: Apr. 8, 2024

(65) Prior Publication Data

US 2025/0068204 A1    Feb. 27, 2025

(30) Foreign Application Priority Data

Aug. 21, 2023    (JP) ................................. 2023-134023

(51) Int. Cl.
*G05F 1/67*        (2006.01)
*H02J 3/38*        (2006.01)
*H02J 101/24*      (2026.01)

(52) U.S. Cl.
CPC ................ *G05F 1/67* (2013.01); *H02J 3/381* (2013.01); *H02J 2101/25* (2026.01)

(58) Field of Classification Search
CPC .......... G05F 1/67; H02J 3/381; H02J 2300/26
See application file for complete search history.

(56) References Cited

U.S. PATENT DOCUMENTS

| | | | | |
|---|---|---|---|---|
| 10,185,346 B2* | 1/2019 | Matan | ........................ | H02J 3/50 |
| 2010/0052425 A1* | 3/2010 | Moore | ............. | H02J 13/00002 |
| | | | | 307/52 |
| 2010/0301670 A1* | 12/2010 | Wilhelm | ................... | G05F 3/08 |
| | | | | 361/18 |
| 2013/0342017 A1* | 12/2013 | Lipan | ...................... | H02J 3/381 |
| | | | | 307/43 |
| 2016/0028325 A1* | 1/2016 | Redmann | ................... | H02J 3/12 |
| | | | | 363/98 |
| 2017/0222441 A1* | 8/2017 | Chen | ........................ | H02J 3/381 |
| 2022/0153161 A1* | 5/2022 | Miyamoto | ............. | B60L 53/62 |

FOREIGN PATENT DOCUMENTS

| | | |
|---|---|---|
| JP | H08-123563 A | 5/1996 |
| JP | 2010-231456 A | 10/2010 |
| JP | 2016-091431 A | 5/2016 |
| JP | 2019-013074 A | 1/2019 |
| WO | 2013/172053 A1 | 11/2013 |

\* cited by examiner

*Primary Examiner* — Rafael O Leon De Domenech
(74) *Attorney, Agent, or Firm* — SoraIP, Inc.

(57)    ABSTRACT

A solar power generation control device for controlling power generation of a solar panel, comprising: a first control unit that derives, by MPPT control, a control voltage for causing the solar panel to generate the largest electric power based on the output power of the solar panel; a second control unit that derives, based on the output current of the solar panel, a correction voltage for correcting the control voltage; and a third control unit that controls power generation of the solar panel based on a voltage obtained by correcting the control voltage with the correction voltage.

3 Claims, 3 Drawing Sheets

1

SOLAR POWER GENERATION CONTROL DEVICE

CROSS-REFERENCE TO RELATED APPLICATION

This application claims priority to Japanese Patent Application No. 2023-134023 filed on Aug. 21, 2023, incorporated herein by reference in its entirety.

BACKGROUND

1. Technical Field

The present disclosure relates to a solar power generation control device and the like for controlling power generated by a solar panel.

2. Description of Related Art

Japanese Unexamined Patent Application Publication No. 2016-091431 (JP 2016-091431A) discloses a power generation system that uses a solar panel (solar cell module). The power generation system described in JP 2016-091431 A executes maximum power point tracking (MPPT) control in which the output voltage and the output current of the solar panel are controlled so as to track a value corresponding to the maximum power point of the solar panel. In this MPPT control, the maximum power point of the solar panel is searched for using a method such as a hill climbing method any time the generated power of the solar panel changes due to changes in the solar radiation condition or the like.

SUMMARY

In the MPPT control in which the hill climbing method is used, the maximum power point of the solar panel is searched for by performing a process of increasing and decreasing a control voltage that commands the operation of a DCDC converter by a predetermined step voltage. Therefore, when sudden changes in the solar radiation occur in the solar panel such as sudden shading from the sun, the velocity of the MPPT control cannot quickly track the changes in the solar radiation. Therefore, there is an issue that it takes time to specify the maximum power point of the solar panel when sudden changes in the solar radiation occur in the solar panel. The power generation efficiency of the solar panel becomes lower as the time from the changes in the solar radiation to the determination of the maximum power point becomes longer.

The present disclosure has been made in view of the above issue, and an object of the present disclosure is to provide a solar power generation control device capable of shortening the time until a maximum power point of a solar panel is specified and suppressing a decrease in the power generation efficiency of the solar panel.

In order to address the above issue, an aspect of the present disclosure provides a solar power generation control device that controls power generation by a solar panel, including: a first control unit that derives, through maximum power point tracking control, a control voltage for causing the solar panel to generate maximum power based on output power of the solar panel; a second control unit that derives a correction voltage for correcting the control voltage based on an output current of the solar panel; and a third control unit that controls the power generation by the solar panel using a voltage obtained by correcting the control voltage with the correction voltage.

According to the solar power generation control device according to the present disclosure, it is possible to shorten the time until a maximum power point of a solar panel is specified, and to suppress a decrease in the power generation efficiency of the solar panel.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In the solar power generation control device of the present disclosure, it is noticed that the output current of the solar panel greatly changes in accordance with the solar radiation variation of the solar panel. The solar power generation control device of the present disclosure corrects a control voltage corresponding to a maximum power point searched for by a hill-climbing search by MPPT control with a correcting voltage that can be dynamically changed according to an output current of a solar panel. As a result, the control voltage of the solar panel whose maximum power point is shifted due to the sudden solar radiation variation can be rapidly shifted to the vicinity of the maximum power point in the hill-climbing starting voltage of MPPT control by the correcting voltage. Therefore, it is possible to shorten the time until the maximum power point of the solar panel is specified. Hereinafter, an embodiment of the present disclosure will be described in detail with reference to the drawings.

Embodiment

Configuration

Figures 1, 2:
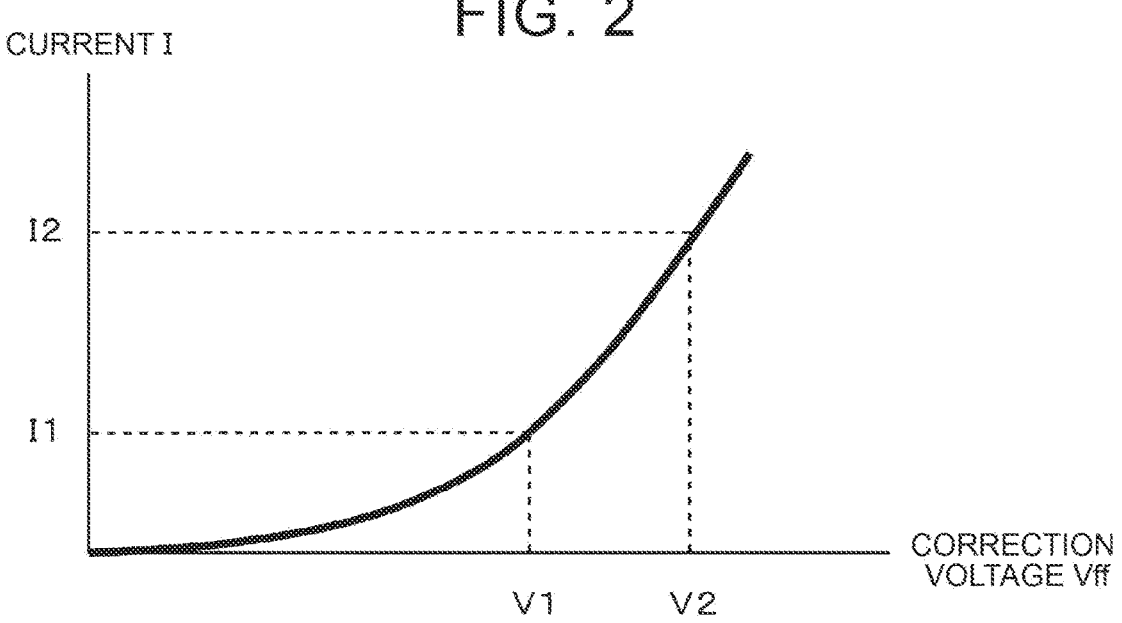
FIG. 1 is a schematic configuration diagram of a solar power generation system including a solar power generation control device according to the present embodiment.
FIG. 2 is a diagram illustrating an example of a voltage correction map.

FIG. 1 is a diagram illustrating a schematic configuration of a solar power generation system 1 including a solar power generation control device 40 according to an embodiment of the present disclosure. The solar power generation system 1 illustrated in FIG. 1 includes a solar panel 10, a sensor 20, a DCDC converter 30, and a solar power generation control device 40. In FIG. 1, a connection line through which electric power is transmitted is indicated by a thick line, and a connection line through which control signals, detection values, and the like other than electric power are transmitted and received is indicated by a thin arrow line.

The solar power generation system 1 can be mounted on vehicles such as hybrid electric vehicle (HEV), plug-in hybrid electric vehicle (PHEV), and battery electric vehicle (BEV).

The solar panel 10 is a device capable of generating electric power corresponding to the irradiation amount of sunlight. The solar panel 10 is typically an assembly of solar cells. The solar panel 10 outputs the generated electric power to DCDC converter 30 via the sensor 20.

The sensor 20 is a configuration for acquiring a power generation state of the solar panel 10. The sensor 20 acquires at least the values of the voltage V and the current I output from the solar panel 10 as the power generation state of the solar panel 10. As the sensor 20, a detection element such as a voltage sensor or a current sensor can be used. Note that the sensor 20 may be configured integrally with the solar panel 10 or may be included in the solar power generation control device 40.

DCDC converter 30 is a configuration for controlling power generation of the solar panel 10. DCDC converter 30 controls the power generation status (power point) of the solar panel 10 in accordance with a voltage command supplied from the solar power generation control device 40, and outputs power obtained by the control. The power of DCDC converter 30 is supplied to batteries, loads, and the like (not shown).

The solar power generation control device 40 is configured to control the operation of DCDC converter 30 based on the power generation status of the solar panel 10 acquired by the sensor 20 so that the solar panel 10 can generate the largest electric power. The solar power generation control device 40 includes a MPPT control unit 41 that is a first control unit, a feedforward control unit 42 that is a second control unit, and a correction control unit 43 that is a third control unit in a configuration.

MPPT control unit 41 receives a detection value (V value) of the output voltage V and a detection value (I value) of the output current I of the solar panel 10 from the sensor 20. Then, MPPT control unit 41 executes MPPT control for searching for the highest power point of the solar panel 10 in the present solar radiation condition based on the output power P of the solar panel 10 obtained from the V value and the I value. For MPPT control of the present embodiment, a well-known technique called a so-called hill-climbing method can be used. MPPT control unit 41 outputs, as a control voltage Vmppt, the voltage derived on the assumption that the solar panel 10 is capable of outputting the largest power to the correction control unit 43 in a predetermined first cycle. The length of the first cycle is not particularly limited. The length of the first cycle may be arbitrarily set according to the performance required for the solar power generation system 1.

The feedforward control unit 42 receives a detection value (I value) of the output current I of the solar panel 10 from the sensor 20. Then, the feedforward control unit 42 executes feedforward control for deriving a correction voltage Vff, which is a voltage for correcting the control voltage Vmppt derived by MPPT control unit 41, based on the I-value. More specifically, the feedforward control unit 42 derives a correction voltage Vff based on a voltage correction map prepared in advance. FIG. 2 illustrates an example of a voltage correction map. In FIG. 2, for example, if the output current I of the solar panel 10 is "I1", "V1" is derived as the correction voltage Vff.

Figure 3:
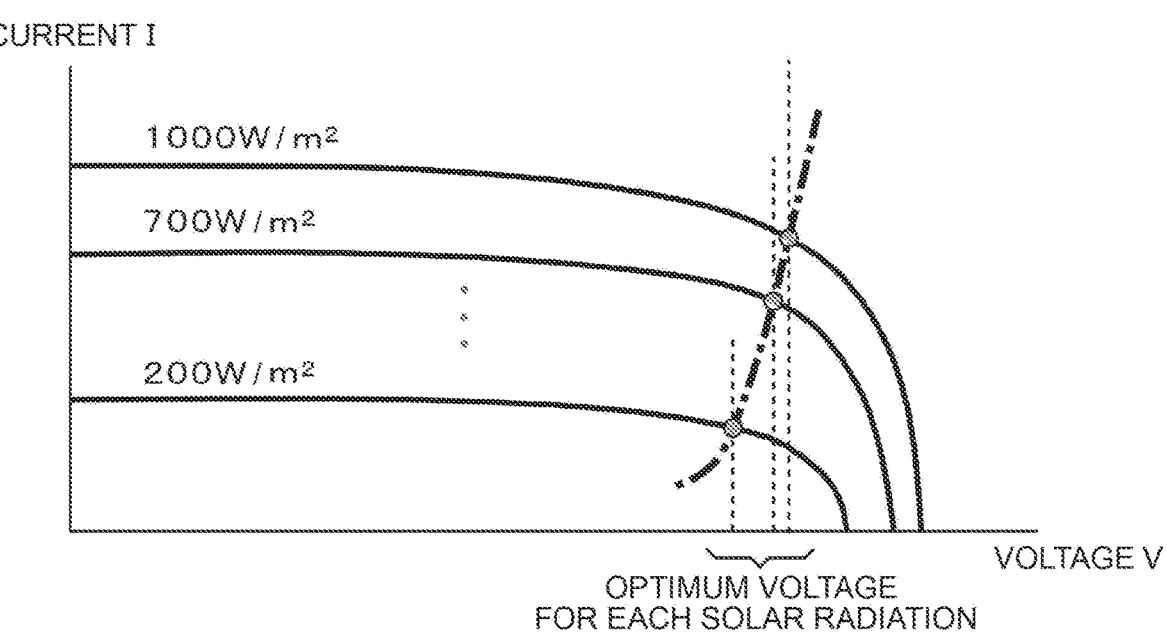
FIG. 3 is a diagram illustrating an exemplary I-V curve of a solar panel according to a solar radiation condition.

The voltage-corrected map of FIG. 2 can be generated from I-V curve of the solar panel 10 according to the solar radiation amount. In FIG. 3, an example of I-V curve when 200 W/m² , 700 W/m² and 1000 W/m² of solar radiation is applied to the solar panel 10 is shown. As shown in FIG. 3, the optimum voltage corresponding to the maximum power point of the solar panel 10 (open circles in FIG. 3) varies depending on the amount of solar radiation, and the optimum voltage varies so as to increase as the amount of solar radiation increases (dashed-dotted line in FIG. 3). In the present embodiment, the correction voltage Vff is determined based on the respective voltage differences in the optimum voltage that fluctuate due to the change in the amount of solar radiation. As an example, it is possible to create a voltage correction map in which the correction voltage Vff in the solar radiation of 200 w/m² is 0 V, the correction voltage Vff in the solar radiation of 700 w/m² is 3 V (=38 V-35 V), and the correction voltage Vff in the solar radiation of 1000 w/m² is 4 V (=39 V-35 V), when the optimum voltage in the solar radiation of 200 W/m² is 35 V, the optimum voltage in the solar radiation of 700 w/m² is 38 V, and the optimum voltage in the solar radiation of 1000 w/m² is 39 V, and the optimum voltage "35 V" is used as a reference for correction. The correction voltage Vff is not limited to a positive value, and may be a negative value.

The feedforward control unit 42 outputs the correction voltage Vff derived based on the output current I of the solar panel 10 to the correction control unit 43. The correction voltage Vff is preferably derived (updated) at a predetermined second cycle shorter than the first cycle of MPPT control described above. In this way, it is possible to quickly respond to the latest solar radiation situation of the solar panel 10. The length of the second cycle can be arbitrarily set according to the response performance or the like that the solar power generation control device 40 wants to realize. The second period may be a period in which the correction voltage Vff is output to the correction control unit 43, or may be a period in which the output current I of the solar panel 10 is acquired from the sensor 20.

The correction control unit 43 corrects the voltage derived by MPPT control unit 41 with the voltage derived by the feedforward control unit 42. The correction control unit 43 controls the operation of DCDC converter 30 using the corrected voltage as a command value. More specifically, the correction control unit 43 adds the correction voltage Vff derived by the feedforward control unit 42 to the control voltage Vmppt derived by MPPT control unit 41. The correction control unit 43 sets the added voltage (Vmppt+ Vff) to a signal of a format suitable for controlling DCDC converter 30 (for example, a PWM signal applied to the gate of the transistor). Then, the correction control unit 43 outputs a format suitable for the control of DCDC converter 30 to DCDC converter 30. The control of DCDC converter 30 by the correction control unit 43 is reflected in the output voltage V and the output current I of the solar panel 10 and fed back to the solar power generation control device 40.

The solar power generation control device 40 may typically be configured as an electronic control unit (ECU: Electronic Control Unit) including a processor such as a microcomputer, a memory, an input/output interface, and the like. The electronic control unit can realize the functions of MPPT control unit 41, the feedforward control unit 42, and the correction control unit 43 by the processor reading and executing the program stored in the memory.

Control Example

Further, with reference to FIGS. 4 and 5, the control performed by the solar power generation control device 40 according to the present embodiment will be described in an easy-to-understand manner.

Figure 4:
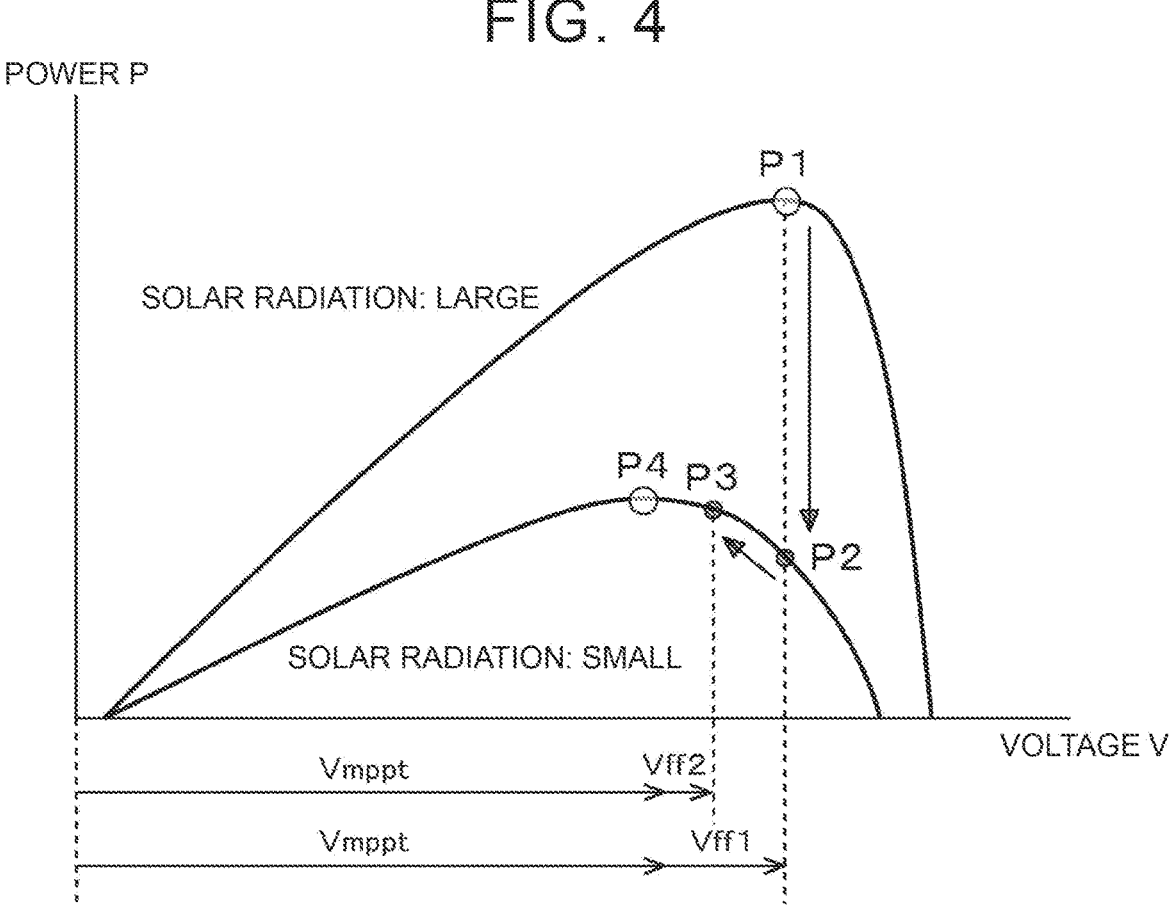
FIG. 4 shows an exemplary P-V profile of a solar panel.

FIG. 4 is a diagram for explaining control performed by the solar power generation control device 40 when the amount of solar radiation received by the solar panel 10 rapidly decreases, and is a diagram illustrating an exemplary P-V curve of the solar panel 10. In FIG. 4, it is assumed that the solar radiation amount suddenly decreases and the generated power of the solar panel 10 decreases to P2 from a state in which the solar panel 10 is generating electric power at the maximum power P1 due to the large solar radiation amount (the voltage command value of the correction control unit 43 is "Vmppt+Vff1").

In the conventional MPPT control, a hill-climbing search must be executed steadily from the electric power P2 to the maximum power P4 in the current small solar radiation amount. On the other hand, in the control of the present embodiment, when the generated electric power of the solar panel 10 has decreased to the electric power P2, the correction voltage Vff1 is changed to a smaller correction voltage Vff2 in accordance with the output current I of the solar panel 10 that has decreased with the decrease in the electric power (the correction quantity is decreased). By this control, the voltage command value of the correction control unit 43 becomes "Vmppt+Vff2", and the start point at which MPPT control unit 41 performs the hill-climbing search is shifted (jumped) from the point of the power P2 to a point where the solar panel 10 can generate power P3. Therefore, the time until MPPT control unit 41 reaches the maximum power P4 can be greatly shortened as compared with the conventional control.

Figure 5:
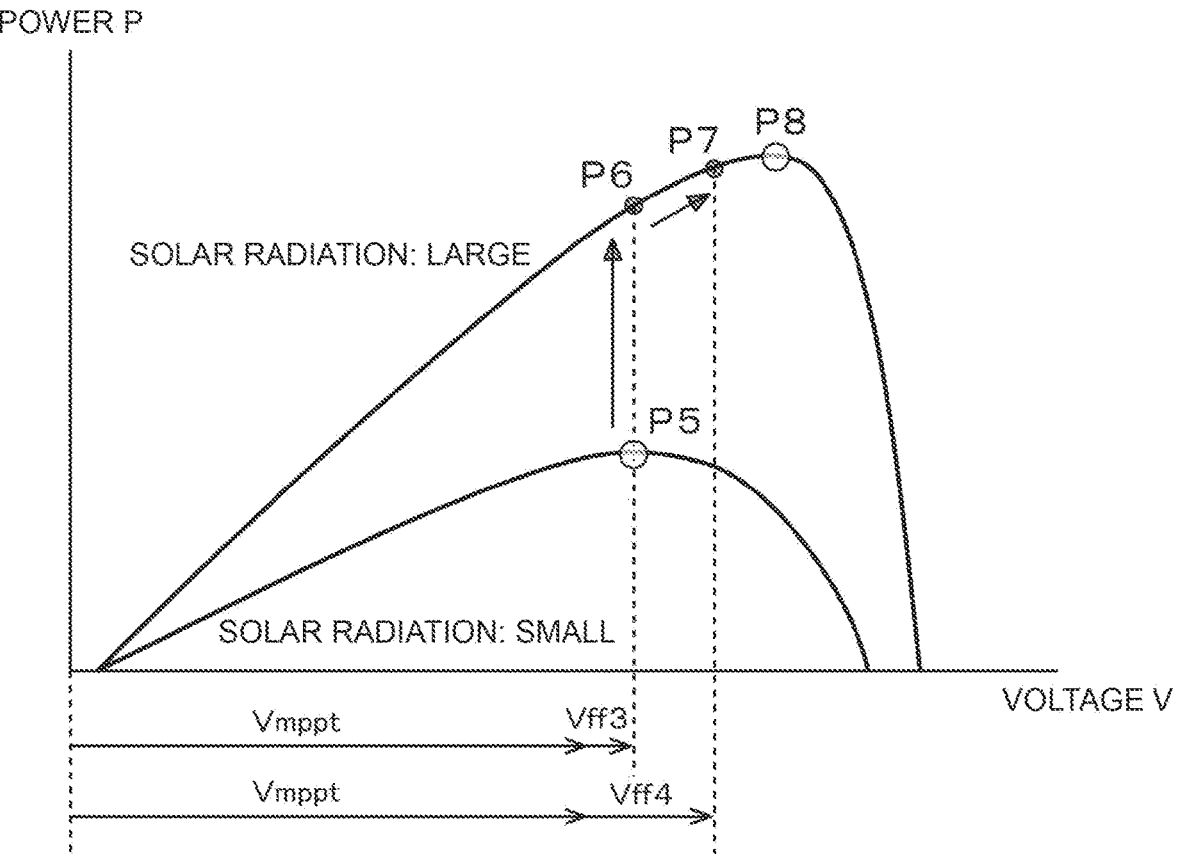
FIG. 5 is a diagram illustrating an exemplary P-V of a solar panel.

FIG. 5 is a diagram for explaining control performed by the solar power generation control device 40 when the amount of solar radiation received by the solar panel 10 rapidly increases, and is a diagram illustrating an exemplary P-V curve of the solar panel 10. In FIG. 5, it is assumed that the solar radiation amount suddenly increases and the generated power of the solar panel 10 rises to P6 from a state in which the solar panel 10 is generating electric power at the maximum power P5 due to the small solar radiation amount (the voltage command value of the correction control unit 43 is "Vmppt+Vff3").

In the conventional MPPT control, the hill-climbing search must be executed one step at a time from the power P6 to the maximum power P8 in the current large solar radiation amount. On the other hand, in the control of the present embodiment, when the generated electric power of the solar panel 10 rises to the power P6, the correction voltage Vff3 is changed to a correction voltage Vff4 larger than the output current I of the solar panel 10 that has increased with the increase of the electric power (the correction quantity is increased). By this control, the voltage command value of the correction control unit 43 becomes "Vmppt+Vff4", and the start point at which MPPT control unit 41 performs the hill-climbing search is shifted (jumped) from the point of the power P6 to a point where the solar panel 10 can generate power P7. Therefore, the time until MPPT control unit 41 reaches the maximum power P8 can be greatly shortened as compared with the conventional control.

Operations and Effects

As described above, the solar power generation control device 40 according to the embodiment of the present disclosure includes MPPT control unit 41 (first control unit) that derives the control voltage Vmppt for causing the solar panel 10 to generate the largest electric power based on the output power P (I,V) of the solar panel 10 by MPPT control, the feedforward control unit 42 (second control unit) that derives the correction voltage Vff for correcting the control voltage Vmppt based on the output current I of the solar panel 10, and the correction control unit 43 (third control unit) that controls the power generation of the solar panel 10 using the voltage obtained by adding the correction voltage Vff to the control voltage Vmppt as a command value.

According to this configuration, a part of the voltage command value instructed to DCDC converter 30 in order to cause the solar panel 10 to generate the largest electric power can be set to a correction value that can be changed in accordance with the output current I of the solar panel 10 that quickly responds to a change in solar radiation. Accordingly, the control voltage Vmppt of the solar panel 10 in which the maximum power point is largely shifted due to the sudden solar radiation variation can be shifted (jumped) to the vicinity of the maximum power point by the correcting voltage Vff. Therefore, since the hill-climbing start point of MPPT control approaches the maximum power point of the solar panel 10, the time until the maximum power point of the solar panel 10 is specified can be shortened as compared with the control without using the correction voltage Vff. Therefore, it is possible to suppress a decrease in the power generation efficiency of the solar panel 10.

Further, in the solar power generation control device 40 according to the present embodiment, the second cycle in which the correction voltage Vff is derived by the feedforward control unit 42 is shorter than the first cycle in which MPPT control unit 41 searches for the highest power point of the solar panel 10. As a result, the control-voltage Vmppt of MPPT control can be made faster and closer to the maximum-power point, so that further time-reduction can be expected.

Further, the solar power generation control device 40 according to the present embodiment can grasp the change in solar radiation of the solar panel 10 by monitoring the output current I of the solar panel 10. Accordingly, it is possible to easily solve the conventional problem that, when the generated electric power of the present time is lower than the generated electric power of the previous time in the hill-climbing step of MPPT control, it is not possible to clearly determine whether the generated electric power is caused by a slight deviation from the maximum electric power point of the solar panel 10 or a large deviation due to a sudden change in solar radiation.

Although an embodiment of the present disclosure has been described above, the present disclosure can be regarded as a solar power generation control device, a solar power generation system including a solar power generation control device, a method executed by the solar power generation control device, a program for executing the method, a non-transitory computer-readable recording medium storing the program, and a vehicle equipped with a solar power generation system including a solar power generation control device.

The solar power generation control device of the present disclosure can be used in a solar power generation system or the like mounted on a vehicle.

What is claimed is:

1. A solar power generation control device that controls power generation by a solar panel, comprising:

a first control unit that derives, through maximum power point tracking control, a control voltage for causing the solar panel to generate maximum power based on output power of the solar panel;

a second control unit that derives a correction voltage for correcting the control voltage based on an output current of the solar panel; and a third control unit that controls the power generation by the solar panel using a voltage obtained by correcting the control voltage with the correction voltage, wherein the second control unit derives the correction voltage in a second period shorter than a first period in which the first control unit derives the control voltage.

2. The solar power generation control device according to claim 1, wherein the second control unit derives the correction voltage using a map in which the output current and the correction voltage are correlated with each other, the map being determined based on changes in a current-voltage curve according to a solar radiation condition of the solar panel.

3. A solar power generation control device that controls power generation by a solar panel, comprising:

a first control unit that derives, through maximum power point tracking control, a control voltage for causing the solar panel to generate maximum power based on output power of the solar panel;

a second control unit that derives a correction voltage for correcting the control voltage based on an output current of the solar panel; and a third control unit that controls the power generation by the solar panel using a voltage obtained by correcting the control voltage with the correction voltage, wherein the second control unit derives the correction voltage so as to be lower as the output current of the solar panel is smaller.

* * * * *